United States Patent
Backes et al.

[11] Patent Number: 5,818,838
[45] Date of Patent: Oct. 6, 1998

[54] METHOD AND APPARATUS FOR TRANSPARENT INTERMEDIATE SYSTEM BASED FILTERING ON A LAN OF MULTICAST PACKETS

[75] Inventors: Floyd Backes, Temple, N.H.; Cyndi Jung, Menlo Park, Calif.

[73] Assignee: 3Com Corporation, Santa Clara, Calif.

[21] Appl. No.: 542,157

[22] Filed: Oct. 12, 1995

[51] Int. Cl.[6] ............................. H04L 12/46; H04L 12/56
[52] U.S. Cl. ..................... 370/390; 370/401; 370/432; 370/911
[58] Field of Search ..................... 370/389, 390, 370/360, 362, 363, 469, 400–404, 410, 431, 432, 486, 463, 487, 489, 490, 492, 501, 502, 449, 910, 911; 340/825.52, 825.53; 395/309

[56] References Cited

U.S. PATENT DOCUMENTS

| | | | |
|---|---|---|---|
| 5,361,256 | 11/1994 | Doeringer et al. | 340/825.52 |
| 5,500,860 | 3/1996 | Perlman et al. | 370/401 |
| 5,517,494 | 5/1996 | Green | 370/408 |
| 5,530,703 | 6/1996 | Liu et al. | 370/402 |
| 5,539,737 | 7/1996 | Lo et al. | 370/401 |
| 5,570,366 | 10/1996 | Baker et al. | 370/401 |
| 5,608,726 | 3/1997 | Virgile | 370/401 |
| 5,684,800 | 11/1997 | Dobbins et al. | 370/432 |
| 5,696,763 | 12/1997 | Gang, Jr. | 370/390 |

OTHER PUBLICATIONS

S. Deering, "Host Extensions for IP Multicasting," IETF RFC 1112, Network Working Group (Aug. 1989).
Green, "Inside SMRP Router Specification" (1994).

*Primary Examiner*—Douglas W. Olms
*Assistant Examiner*—Seema S. Rao
*Attorney, Agent, or Firm*—Townsend and Townsend and Crew LLP

[57] ABSTRACT

A bridge (62) capable of reducing unwanted WAN multicast packet traffic in a LAN is disclosed. The bridge examines the contents of WAN multicast query and report packets and includes this information in its filtering database (88). The bridge designates ports on which query packets are received as query ports. When there is no WAN router generating multicast query packets into the LAN, the bridge simulates the behavior of a WAN router and generates WAN multicast query packets so as to cause report packet generation by end systems. A timeout interval for undesignating query ports and a method for determining an appropriate timeout for a port is disclosed.

30 Claims, 4 Drawing Sheets

| ETHERNET HEADER | IP HEADER | DATA | ETHERNET TRAILER (24 BITS) |
|---|---|---|---|
| ETHERNET ADDR(48) | IP ADDR(32) | | |

FIG. 3

HIGH

| LAYER NAME (NUMBER) | DEVICES | DATA | PROTOCOLS |
|---|---|---|---|
| HIGHER LAYER PROTOCOLS | | | |
| APPLICATION LAYER (5) | | FILES | FTP, HTTP |
| TRANSPORT LAYER (4) | ROUTERS | ROUTING PACKETS | TCP, UDP |
| ROUTING LAYER (3) | ROUTERS | ROUTING PACKETS | IP |
| DATA LINK LAYER (2) | BRIDGES | PACKETS | ETHERNET |
| PHYSICAL LAYER (0,1) | REPEATERS | BITS | ETHERNET |

LOW

FIG. 4

METHOD AND APPARATUS FOR TRANSPARENT INTERMEDIATE SYSTEM BASED FILTERING ON A LAN OF MULTICAST PACKETS

BACKGROUND OF THE INVENTION

This invention relates to transmission of information between multiple digital devices on a network and between multiple networks on an internetwork. More particularly, this invention relates to a method and apparatus for allowing an intermediate system within a local area network (LAN) to transparently filter multicast packets from a wide area network or internetwork (WAN) directed to that LAN so that those packets are only delivered to end systems that wish to receive them.

Related technology is discussed in co-assigned U.S. patent applications Ser. Nos. 08/502,835, 08/313,674, now U.S. Pat. No. 5,568,469 and application Ser. No. 08/506,533, now U.S. Pat. No. 5,666,362.

Standards

This specification presumes some familiarity with the general concepts, protocols, and devices currently used in LAN networking applications and in WAN internetworking applications. One set of protocols used for networking within a LAN is the IEEE 802 protocol suite, available from the IEEE (Institute for Electrical and Electronics Engineers). These IEEE 802 protocols have been revised and reissued by the ISO (International Organization For Standardization) with the designation ISO 8802. Among the protocols specified in IEEE 802 are IEEE 802.3, the LAN protocols commonly referred to as Ethernet. A separate set of protocols used in internetworking, i.e. connecting multiple LANs, is referred to as the TCP/IP Protocol Suite. (TCP and IP are acronyms for Transmission Control Protocol and Internet Protocol.) The TCP/IP Suite is promulgated in a series of documents released by the Internet Engineering Task Force. The documents are referred to as RFC's (Requests For Comment) and are available over the Internet at URL http://www.cis.ohio-state.edu:80/hypertext/information/rfc.html or via FTP at ds.internic.net. An overview of concepts necessary for an understanding of the invention is presented below. For a more detailed discussion of background information, the reader should consult the above mentioned standards documents or a number of readily available reference works including Stevens, R. W., *TCP/IP Illustrated*, Addison Wesley, 1994.

FIG. 1

FIG. 1 illustrates a local area network (LAN) 40 of a type that might be used today in a moderate sized office or academic environment and of a type in which the present invention may be effectively employed. LANs are arrangements of various hardware and software elements that operate together to allow a number of digital devices to exchange data within the LAN and also may include internet connections to external wide area networks (WANs) such as WANs 42 and 44. Typical modern LANs such as 40 are comprised of one to many LAN intermediate systems (ISs) such as ISs 60–62 that are responsible for data transmission throughout the LAN and a number of end systems (ESs) such as ESs 50a–d, 51a–c, and 52a–g, that represent the end user equipment. The ESs may be familiar end-user data processing equipment such as personal computers, workstations, and printers and additionally may be digital devices such as digital telephones or real-time video displays. Different types of ESs can operate together on the same LAN. In one type of LAN, LAN ISs 60–61 are referred to as bridges and WAN ISs 63 and 64 are referred to as routers, however many different LAN configurations are possible, and the invention is not limited in application to the network shown in FIG. 1.

The LAN shown in FIG. 1 has segments 70a–e, 71a–e, and 72a–e, and 73a. A segment is generally a single interconnected medium, such as a length of contiguous wire, optical fiber, or coaxial cable or a particular frequency band. A segment may connect just two devices, such as segment 70a, or a segment such as 72d may connect a number of devices using a carrier sense multiple access/collision detect (CSMA/CD) protocol or other multiple access protocol such as a token bus or token ring. A signal transmitted on a single segment, such as 72d, is simultaneously heard by all of the ESs and ISs connected to that segment.

Packets

In a LAN such as 40, data is generally transmitted between ESs as independent packets, with each packet containing a header having at least a destination address specifying an ultimate destination and generally also having a source address and other transmission information such as transmission priority. ESs generally listen continuously to the destination addresses all packets that are transmitted on their segments, but only fully receive a packet when its destination address matches the ESs address. An ES such as 52g may transmit data with any other ES on the LAN by transmitting a data packet containing a destination address for the intended destination. If the intended destination is directly connected to the same segment, such as ES 52d, then ES 52d simply hears and receives the packet as it is being transmitted by 52g. If, however, the destination ES is not directly connected to the same segment as the source ES, then LAN 40 is responsible for transmitting the data to a segment to which the destination ES is connected. Generally, a source ES is not aware of whether a destination ES in its LAN is directly connected to its segment. The source simply transmits the packet with a destination address and assumes that the network will deliver the packet. Transmissions within the LAN are generally source driven, i.e. the LAN will deliver a data packet from a source to the destination address specified in the packet regardless of whether that destination ES actually wants to receive the packet. In general, packets contain user data that the user of an ES wishes to receive, such as portions of a data file which will be reassembled at the ES after all packets that make that file are received or portions of a video stream which will be displayed to the user. Packets may also be control packets, containing control information that is used to facilitate communication within the network.

Drivers, Adaptors, and LAN Topology

Each of the ISs and ESs in FIG. 1 includes one or more adaptors and a set of drivers. An adaptor generally includes circuitry and connectors for communication over a segment and translates data from the digital form used by the computer circuitry in the IS or ES into a form that may be transmitted over the segment. An ES such as 50b will have one adaptor for connecting to its single segment. A LAN IS such as 61 will have five adaptors, one for each segment to which it is connected. A driver is a set of instructions resident on a device that allows the device to accomplish various tasks as defined by different network protocols. Drivers are generally software programs stored on the ISs or ESs in a manner that allows the drivers to be modified without modifying the IS or ES hardware.

LANs may vary in the topology of the interconnections among devices. In the context of a communication network, the term "topology" refers to the way in which the stations attached to the network are interconnected. Common topologies for LANs are bus, tree, ring, and star. LANs may also have a hybrid topology made up of a mixture of these. The overall LAN pictured in FIG. 1 has essentially a tree topology, but incorporating one segment, 72d, having a bus topology. A ring topology is not shown in FIG. 1, but it will be understood that the present invention may be used in conjunction with LANs having a ring topology.

Bridges

The LAN ISs in LAN 40 include bridges 60–63. Bridges are understood in the art to be a type of computer optimized for very fast data communication between two or more segments. For example, bridge 60 is a computer having a processor, a memory for storing network information, connections to two or more separate segments, and a buffer memory for storing packets received from one segment for transmission on another segment. Bridge 60 receives packets from a source segment such as 70f, stores the packets, and then transmits the packets on another segment such as 70a, when the bridge detects that the other segment is silent. A bridge makes no changes to the packets it receives on one segment before transmitting them on another segment. Bridges are not necessary for operation of a LAN and in fact are generally invisible to both the ESs to which they are connected and to other bridges and routers. By invisible it is meant that a prior art bridge does not communicate any control packets to other devices in the network and facilitates communications between devices on two different segments in such a way that neither the sending device nor the receiving device is aware that the devices are not on the same segment.

At its most simple, a bridge temporarily stores any packet data received on one of its connections, or ports, and then, as each other port is available, the bridge forwards, or bridges, the packet out of each other port. Even at this most simple level, a bridge such as 60 tends to isolate network traffic on segments and reduces the chances of collision between packets. Modern bridges, as described below, also provide filtering functions whereby a bridge learns the LAN addresses of all ESs that may be reached through each of its ports and forwards packets only out of the port to which the destination ES of that packet is connected. Filtering bridges are enabled to quickly examine the LAN address of every received packet to determine whether and to which segment that packet must be bridged. As an example, when filtering bridge 62 receives a packet on segment 72a addressed to 52b, that packet is bridged only to segment 72b and not to segments 72c and 72d.

In order to accomplish this filtering function, a bridge must somehow know which ESs are attached to each segment connected to the bridge. Generally, this is done in one of two ways: a bridge may be configured by a human network manager to know the LAN addresses of the ESs connected to each segment, or a bridge may be enabled to learn the LAN address of ESs connected to each segment as the bridge is receiving packets. Bridges enabled to learn which ESs are connected to each of their segments do so by examining the LAN source address of packets received on a particular port. A self-learning bridge generally stores the information it learns from examining the source address of packets in a portion of the bridge's memory referred to herein as a Bridge Filtering Table (BFT). Once a bridge has placed entries in its BFT, upon receiving a packet, the bridge will examine the LAN destination address of the buffered packet and if, according to the BFT, the destination address is on the same segment from which the packet was received then the packet has presumable already been received by the destination ES and the bridge discards the buffered packet. If the destination ES is on a different segment from the originating ES then the bridge bridges the packet by transmitting it on the destination ES's segment. If the destination address is not present in the BFT, then the bridge must bridge the packet to all other segments to insure that the proper ES receives the packet. In this way, self-learning bridges gradually learn more and more about the ESs connected to them and gradually reduce unnecessary data flow through the LAN. In a prior art bridge, construction of the BFT and subsequent filtering of packets is accomplished transparently by the bridge without the need for the ESs to be aware of the bridge or to transmit any control packets to the bridge. A prior art bridge neither transmits nor receives control packets with other devices in the LAN.

Some prior art bridges implement an algorithm known as the Spanning Tree Algorithm which allows them to ensure that a segment that is connected to more than one bridge only receives packets from one of them. This algorithm is described fully in IEEE standard 802.1d.

LAN Broadcast and Group Address Packets

In the previous discussion, it was assumed that every packet in the LAN contained a destination address indicating delivery to just one destination. This is referred to in the art as a unicast packet. It is 5 also possible for a source in LAN 40 to transmit a packet to all the ESs in the network using a special address known as a broadcast address. A broadcast address is special destination address reserved by the LAN protocol for broadcast packets. In most LAN implementations, the broadcast address can never be a source address for a packet and therefore the broadcast address will never be entered into a BFT. Every bridge receiving a broadcast packet will attempt to find the packet's destination address in that bridge's BFT, will fail, and will therefore bridge the packet to all ports, which is exactly what is desired for a broadcast packet. As an alternative, a bridge may be pre-configured by its driver software to recognize broadcast packets and forward them to all ports.

In 802.3 Ethernet, Ethernet addresses are 48 bits. The broadcast address is defined as FFFF or all 1's. 802.3 also defines a set of Ethernet Group Addresses, indicating more than one but less than all destinations. Ethernet Group Addresses are reserved addresses that cannot be assigned to any individual ES or IS. Within a standard prior art LAN, any packet having a Ethernet Group Address is broadcast to every ES in the LAN, and it is up to the individual ESs to determine whether they want to receive the packet based on that packets Group Address.

Routers

ESs within LAN 40 can communicate with any other ES in LAN 40 either directly if the ESs are on the same physical segment or through a bridge. However, if an ES wishes to communicate with an ES or other service on a different LAN, that data must be transmitted over a WAN such as 42. FIG. 2 depicts WAN 42. WAN 42 is a network of networks, or an internetwork. (The largest and most well known internetwork is the world-wide Internet.) WANs are generally comprised of a number of larger computers that are optimized for WAN transmissions, herein referred to as routers 64 and 68a–e. A router is a generally larger computer than a bridge, but, like a bridge, it too has a processor, a memory for storing network information, and connections to two or more separate segments. Some routers, like router 64, provide WAN services to a LAN and in addition can forward WAN packets through the mesh network to facilitate WAN communication. Other routers are multi-user multipurpose computers or file-servers that include routing functions. Still other routers are computers exclusively reserved for handling WAN data traffic.

Communication of WAN packets over WAN 64 via the routers is very different from packet communication within LAN 40 and occurs under a different protocol having a different addressing scheme. Unlike bridges, routers communicate control packets with every ES to which they are attached as well as to other routers in the WAN. A router uses information it receives via control packets and possibly configuration information supplied by a human operator to build a representation for itself of the network, which the router stores in a routing table. A router examines the WAN destination address of every packet it receives and uses information stored in its routing table to make an individual routing determinations about a packet based on the packet's destination address, other information in the packet's header, and the router's knowledge about the dynamic state of the WAN. Unlike a bridge, a router may make two different routing determinations for different packets with the same destination address based on the dynamic state of the WAN. A router such as 64 is generally unaware of the presence of any bridges within a LAN to which it is connected and sends all data into the LAN as though router 64 was directly connected to each ES within the LAN.

Typically, a WAN such as 42 will have a different addressing scheme and different packet structure than that used in the LAN. Every ES in LAN 40 that wishes to receive packets from WAN 42 must have assigned to it a separate WAN address. In TCP/IP, WAN addresses are 32 bits long and are generally written in a dotted decimal notation having values from 0.0.0.0 to 255.255.255.255. Router 64 learns the LAN address and the WAN address of every ES in LAN 40 and translates packets and addresses between LAN 40 and WAN 42.

FIG. 3 depicts a packet as it may be transmitted to or from router 64 on LAN segment 73a. The packet is essentially an Ethernet packet, having an Ethernet header 202 and a 48-bit Ethernet address (00:60:8C:19:AA) 204, and an Ethernet trailer 230. Within the Ethernet packet 200 is contained, or encapsulated, an IP packet, represented by IP header 212, containing a 32 bit IP address 214 (199.35.126.34). Packet 200 contains a data payload 220 which holds the data the user is interested in receiving or holds a control message used for configuring the network.

WAN Multicasting

WAN 42 may be enabled to route WAN multicast packets (WMPs) which are delivered only to those routers that request receipt of them. When running according to the TCP/IP Suite, routers and ESs accomplish multitasking through a special protocol referred to as the Internet Group Management Protocol (IGMP). In IGMP, a source that wishes to send WMPs will be assigned a special WAN multicast destination address from a list of addresses reserved by IGMP for multicast. Within LAN 40, WMPs are translated by router 64 into LAN packets having a LAN destination address that is a LAN Group Address. IGMP includes a direct algorithmic mapping between a WAN IP Multicast Address and a LAN Group Address. According to IGMP, a router such as 64 periodically queries ESs connected to it to report back to the router if they wish to receive any WMP streams. This query is broadcast within LAN 40 to one of the reserved Ethernet Group Addresses. An ES that wants to receive a WMP stream will respond to this IGMP Query by sending an IGMP Report back to router 64. The IGMP report is addressed to a LAN address that corresponds to the WMP address that the ES wishes to receive. An IGMP Report lists a WMP address that the ES wishes to receive. An ES sends a separate report for each WMP stream it wishes to receive. In the art, it is sometimes said that the ES joins a multicast group each time it indicates to the router that it wishes to receive a particular WMP stream. The router compiles the IGMP reports it receives from one or more ESs and then the router sends a request to other routers in WAN 42 requesting delivery of particular WMP streams.

Three details of IGMP are important for the following discussion. One is that an ES may leave a multicast group (i.e. stop receiving WMPs to that multicast address) at any time without informing the router that it no longer wishes to receive those WMPs. The ES simply does not respond the next time that the router sends an IGMP Query on the LAN. (Newer versions of IGMP allow an ES to send a packet telling the router that they no longer wish to receive a particular WMP stream, but these newer versions do not require ESs to do so.) A second important detail of IGMP is that in the case where a LAN such as 40 contains two routers with connections to the same WAN, the IGMP protocol includes a mechanism for preventing both routers from transmitting Query packets to the LAN. According to IGMP, when a router receives a Query packet on any of its LAN ports, it examines the WAN source address of that packet and if the source address is lower than the router's own WAN address, the router stops transmitting Query packets. Thus, eventually, only one router (the one with the lowest IP address) will transmit Query packets on any given LAN.

A final important detail of IGMP is that ESs monitor their segment and read any IGMP Reports that appear on their segment. According to IGMP, an ES does not send an IGMP Report for a WMP address if the ES detects that another ES on its segment has already requested that WMP address. The second ES will simply receive the WMPs as they are being transmitted to the first ES to request them. What this means is that under IGMP, a router never knows whether only one or more than one ESs on the LAN to which it is connected actually wishes to receive a particular WMP stream. The router therefore cannot direct WMPs to a particular ES LAN destination address, but must direct the WMP to one of the reserved LAN Group Addresses. As described above, within LAN 40, Group Address packets are delivered via the bridges to every segment in the LAN. Therefore, even if just ES 72b in LAN 40 requests a particular WAN MP stream, that WMP stream will be converted to a LAN Group Address and be delivered to every ES in LAN 40. In the case of a heavy WMP stream such as a video link, this can result in a huge amount of unwanted LAN traffic.

One prior art solution to this problem would be to reconstruct LAN 40 and replace each of the bridges 60–63 with computers that function more as routers. These "routers" would then be able to participate in the overall IGMP protocol and direct WMP packets only to those segments where they were wanted. This is an expensive proposition, however, increasing the cost of the LAN hardware infrastructure, LAN management, and likely decreasing the overall speed of the LAN.

Layers

A final background concept important to understanding the present invention is the concept of layered network protocols. Modern communication standards, such as the TCP/IP Suite and the IEEE 802 standards, organize the tasks necessary for data communication into layers. At different layers, data is viewed and organized differently, different protocols are followed, and different physical devices handle the data traffic. FIG. 4 illustrates one example of a layered network standard having a number of layers, which we will refer to herein as: the Physical Layer, the Data Link Layer, the Routing Layer, the Transport Layer and the Application Layer. These layers correspond roughly to the layers as defined within the TCP/IP Suite. (The 802 standard has a different organizational structure for the layers and uses somewhat different names.)

At the Physical Layer, data is treated as an unformatted bit stream transmitted from one transmitter to one or more receivers over a single segment. In IEEE 802, for example, the Physical Layer handles the encoding/decoding of physical transmission signals, the generation/removal of preambles for transmitted data used for synchronization (such as start and stop bits), and the bit transmission/reception protocol. Different Physical Layer protocols and devices exist for transmitting data as electrical signals, optical signals, or radio signals over wire, optical fiber, or other media. ES and IS hardware generally interact with the physical layer through adaptors that accepts binary data from the IS or ES and translate that data into signals transmittable on the medium. The adaptors includes the circuitry and connections necessary for communication over the medium. Adaptors for PCs are commonly available as standard bus cards which plug into a PC parallel bus and have a connector for connecting to the medium on which network signals are transmitted.

At the Data Link Layer (DLL) (sometimes referred to as Layer 2 or the MAC layer), data is treated as a series of independent packets, each packet containing its own destination address and fields specifying packet length, priority, and codes for error checking. A bridge is one type of device that assists with transmissions over the network at the Data Link Layer. IEEE 802 is primarily concerned with the data link and physical layers: Ethernet and Token Ring are two common protocols that operate at the Data Link Layer and Physical Layer.

At the Routing Layer (sometimes referred to as Layer 3), data is treated as a series of independent routing packets. A routing packet contains information necessary for correct delivery of the packet over a large WAN such as the internet. This information is used at the Routing Layer to transfer the packet through the network to its destination. A router is a device that assists with transmissions over the network at the Routing Layer. In the TCP/IP Suite, protocols that handles transmission at the Routing Layer include IP, IGMP, and ICMP.

At the transport layer, data is seen as a connection between two hosts on the network. Transport layer protocol in TCP/IP includes TCP and UDP.

The Application layer includes programs that a user interacts with to use network functions, such as e-mail, ftp, remote login, or http. Data at the application layer is often viewed as files.

An important ideal in layered standards is the ideal of layer independence. A layered protocol suite specifies standard interfaces between layers such that, in theory, a device and protocol operating at one layer can co-exist with any number of different protocols operating at higher or lower layers, so long as the standard interfaces between layers are followed.

To tie the concept of layers back to the preceding discussion, it may be seen that in LAN 40, WAN transmissions take place at the Routing Layer while LAN transmissions take place at the lower Data Link Layer. At the Routing Layer, ESs communicate control packets to the routers to which they are attached. However, at the Data Link Layer, ESs communicate no control packets with bridges and therefore ESs cannot participate in a multicast protocol at the Data Link Layer.

From the preceding it will be seen that what is needed is a LAN capable of correctly accepting and delivering WAN multicast packets to end systems that desire to receive them, but that does not experience the heavy amounts of undesired traffic generated in prior art LANs.

Further descriptions of LAN technology may be found in related co-pending and co-assigned applications such as U.S. Ser. No. 08/506,533 entitled METHOD AND APPARATUS FOR ASYNCHRONOUS PPP TO SYNCHRONOUS PPP CONVERSION incorporated herein by reference for all purposes.

For purposes of clarity, the present discussion refers to network devices and concepts in terms of specific examples, namely Ethernet and TCP/IP. However, the method and apparatus of the present invention may operate with a wide variety of types of network devices including networks dramatically different from the specific examples illustrated in FIG. 1 and described below. In particular, the present invention would have application within a set of proprietary WAN and LAN standards has been developed by Apple Computer Corporations and is referred to as Applelink and SMRP. It is therefore not intended that the invention be limited except as done so in the attached claims.

SUMMARY OF THE INVENTION

According to the present invention, an improved LAN is capable of receiving WMPs from a WAN via a router and delivering those WMPs only on segments having at least one ES that wishes to receive the WMPs. The invention accomplishes this by modifying layer 2 intermediate systems within the LAN to listen to layer 3 routing control packets and to make layer 2 filtering decisions based on information in the layer 3 packets. The invention includes a mechanism for a layer 2 intermediate system to generate layer 3 Query Packets when no higher level system is generating such packets in the LAN. The invention represents a substantial improvement over many types of prior art LANs where WAN MPs are flooded to every segment in the LAN. Under one embodiment of the present invention, no modification is required in the protocols or hardware of the ESs or the WAN. Stated another way, the present invention accomplishes filtering of Routing Layer (layer 3) packets at the Data Link Layer (layer 2), without the need for any modification of Routing Layer protocols. The present invention allows a bridge to forward WMPs selectively, based on Routing Layer requests from the ESs.

A bridge according to the present invention accomplishes these advantages by carefully monitoring all Routing Layer Multicast data and control packets and making forwarding decisions thereby. The bridge uses this information to augment its filtering database, thereby allowing for very fast filtering of unwanted WMPs.

BRIEF DESCRIPTION OF THE DRAWINGS

FIG. 3 is a diagram of an IP packet encapsulated in an Ethernet packet;

FIG. 4 is a diagram showing a layered network protocol;

DETAILED DESCRIPTION OF PREFERRED EMBODIMENTS

The following detailed discussion will describe the function of an improved bridge according to the invention in terms of a two protocol suites that have previously been discussed, 802.3 and TCP/IP. It will be understood to those of skill in the art that the invention also has application in other protocol suites employing an analogous multicast protocol.

Figure 1:
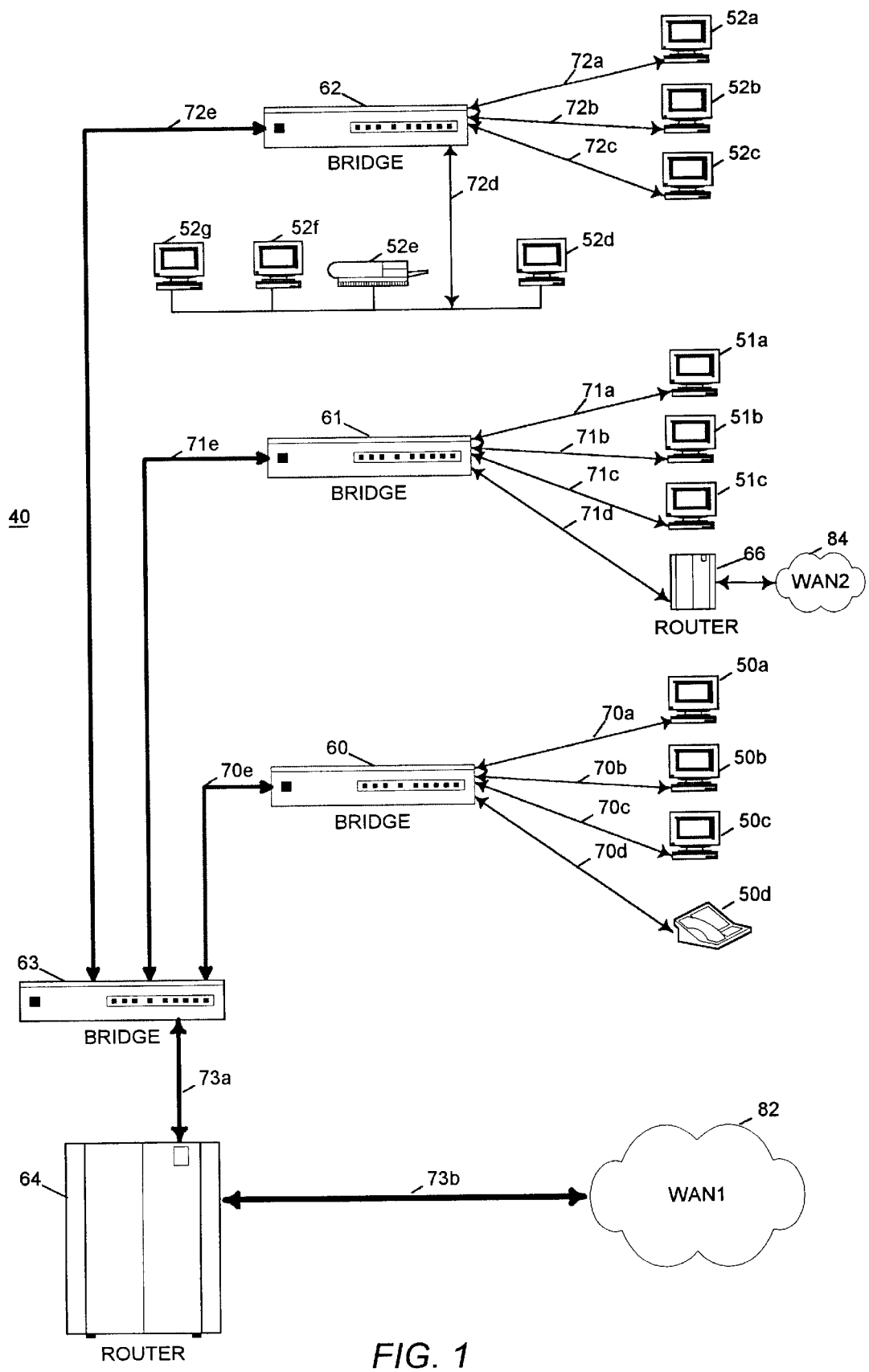
FIG. 1 is a diagram of a local area network of one type in which the invention may be effectively employed.
Figure 2:
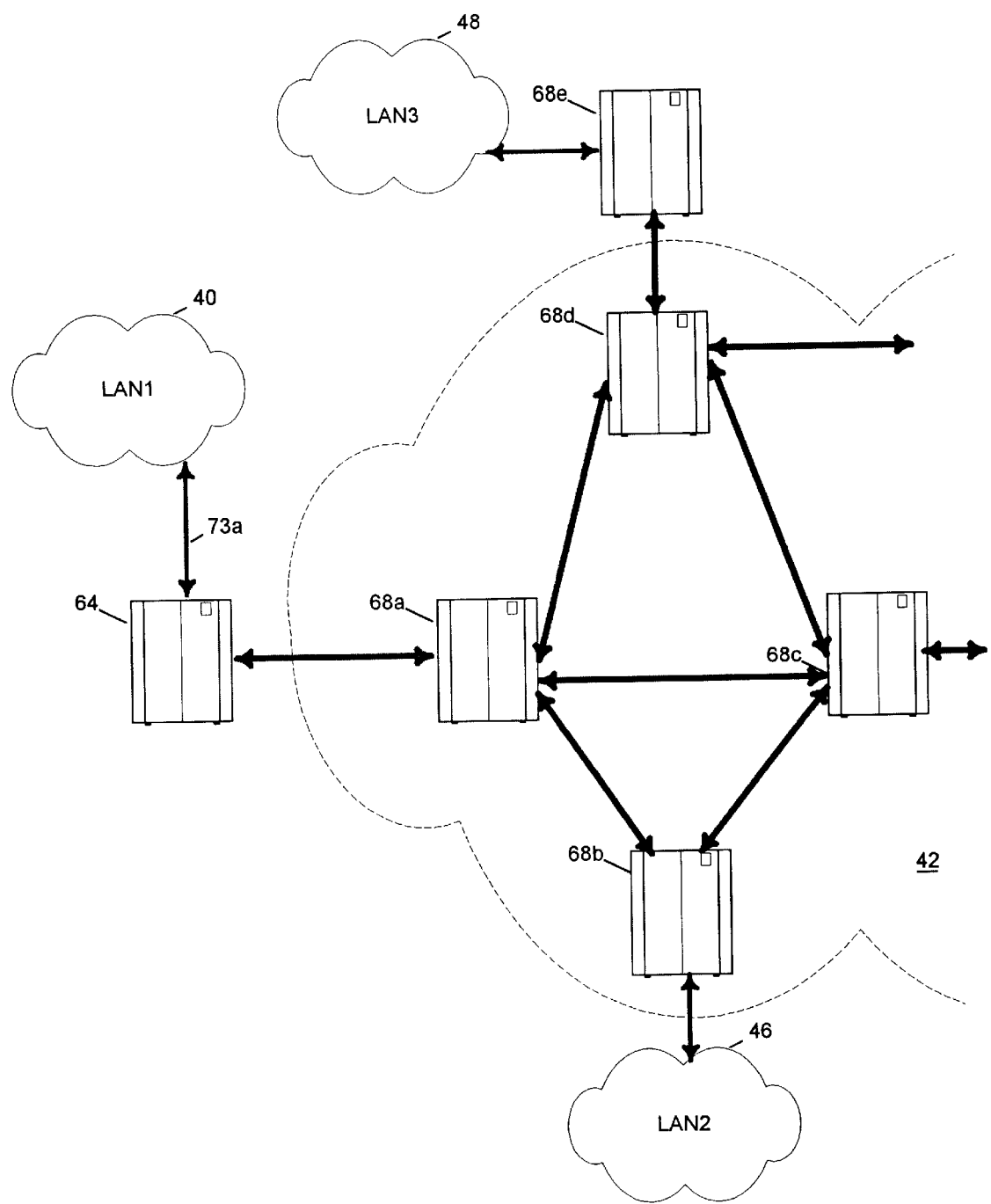
FIG. 2 is a diagram of a wide area network of one type in which the invention may be effectively employed.
Figure 5:
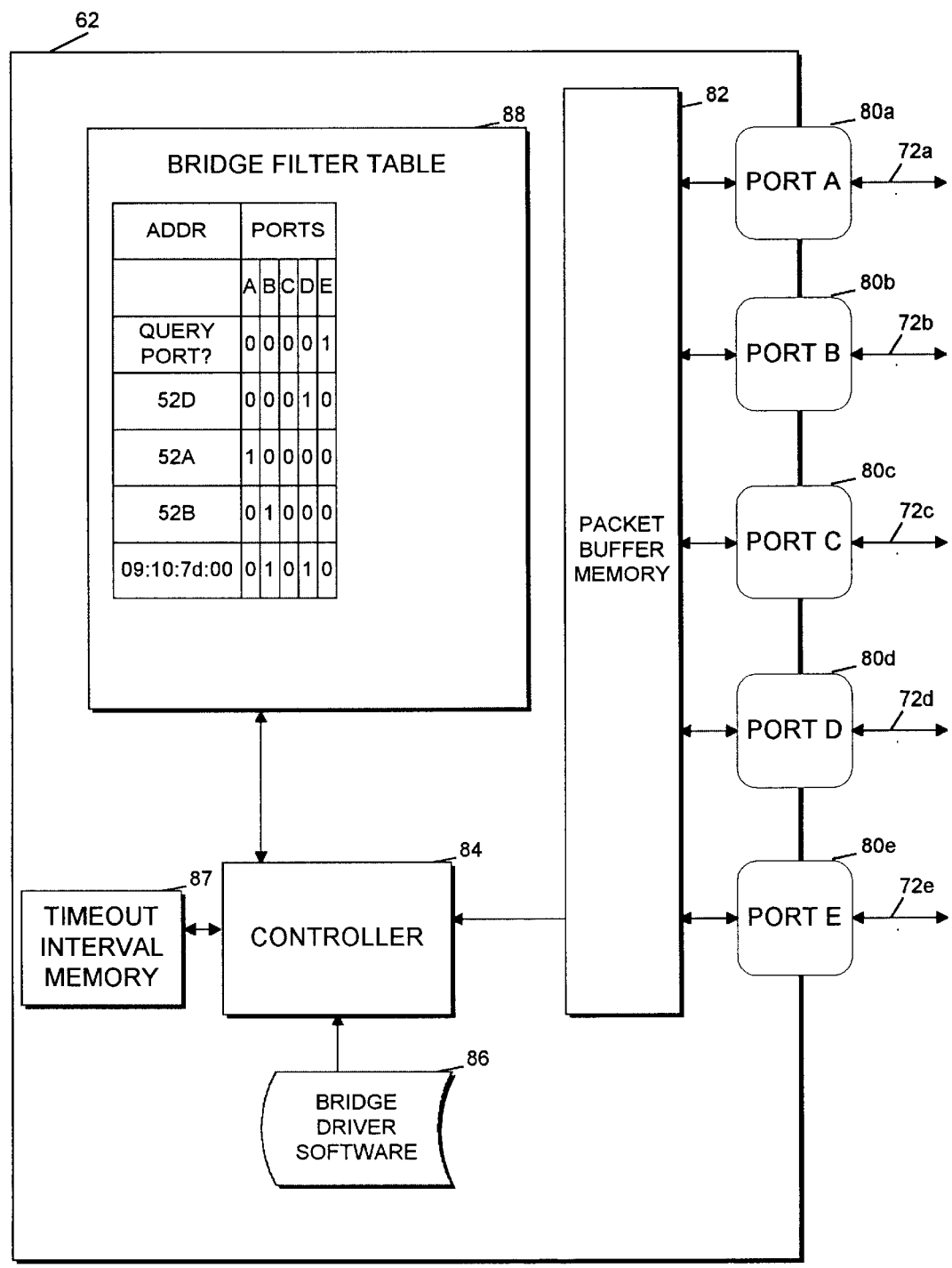
FIG. 5 is a block circuit diagram of an improved bridge according to the invention.

FIG. 5 is a block diagram of a bridge 62 with improvements according to an embodiment of the invention. The bridge has five ports 80a–e which provide circuitry and connections that enable the bridge to communicate on each segment 72a–e. Packets received over any port are stored in Shared Packet Buffer Memory 82. Controller 84 reads each received packet and processes that packet based on the instructions specified in driver 86. Controller 84 includes connections (not shown) to each other bridge component for sending and receiving control signals.

As is known in prior art bridges, controller 84 maintains a Bridge Filtering Table (BFT) 88 in an area of memory separate from the packet buffer. As is known in the prior art, BFT 88 contains entries for each ES LAN address from which a packet is received. Each entry specifies the LAN address from which a packet is received and includes a means for indicating a port to which that address is connected. According to a default operation mode, bridge 62 gradually learns about ESs to which it is connected by reading the LAN source addresses of packets received on its ports. Once a bridge has identified a particularly ES LAN address and stored an identifier for the port to which that ES is connected in BFT 88, packets received at bridge 62 addressed to that LAN address are bridged only to the port to which the ES is connected. In this way, bridge 62 gradually reduces unnecessary traffic on the network.

According to the invention, bridge 62 is additionally enabled to filter IGMP multicast packets based on their LAN group address as follows. On power up or system reset or when none of its ports are designated Query Ports as described below, an improved bridge 62 according to the invention, acts as though it were a router and transmits IGMP Query packets at regular intervals out of each of its ports A–E. Initially, each of these ports are designated by bridge 62 as non-Query Ports. Bridge 62 transmits Queries with a fake WAN source address which is set to be a higher value than any possible WAN source address of a real IP router. This fake WAN source address is assigned to a bridge according to the invention. Standard prior art bridges do not have a WAN source address because they do not communicate at layer 3. In response to these Queries, ESs attached to bridge 62 that wish to receive WMPs will transmit Reports on their segments. These reports will be received at bridge 62. These Reports have a destination address equal to the multicast address from which the ESs wish to receive packets and the source address of the ES sending the Report. Each time bridge 62 hears a Report on one of its ports, it stores an identifier for the port and the LAN Group address in BFT 88 indexed according to that LAN Group Address and indicating on which port the Report Packet was received by placing a flag value in an appropriate location (in the example in FIG. 5, bridge 62 places a "1" in a column designating ports B and D wish to receive WMP packets addressed to Ethernet Group address 09:10:7D:00). When any subsequent packets are received at bridge 62 destined for that LAN Group, bridge 62 looks up the LAN Group Address in BFT 88 and forwards those packets only out of the ports specified in that group.

Whenever bridge 62 receives a Query Packet on one of its ports, it examines the WAN Source Address of the Query. If the WAN source address of the received Query Packet is greater than bridge 62's fake WMP source address, bridge 62 continues sending out its own Query Packets at a periodic interval and it marks the port on which the Query was received as a non-Query Port. If the WAN source address of the received Query Packet is less than bridge 62's fake WMP source address, bridge 62 stops sending out its own Query Packets and marks the port on which the Query Packet was received as a Query Port. In this way, a bridge according to the invention will always "lose" to a real IP router connected to a segment of the bridge's LAN. Alternatively, bridge 62 could examine a LAN source address to determine priority.

According to a further embodiment of the present invention, there may be different types of LAN intermediate systems according to the invention each having different capabilities. For example, in one LAN some ISs according to the invention may be fully IEEE 802.1d compliant bridges that therefore fully implement the bridge Spanning Tree Algorithm while other ISs according to the invention may not fully implement the Spanning Tree Algorithm. In this case it would be desirable in the LAN for an IS that is fully compliant with IEEE 802.1d to be selected as a fake router over an IS that is not fully 802.1d compliant. Accordingly, according to one embodiment of the invention, there are reserved two different fake WAN source addresses for LAN intermediate systems to use when they generate Query packets. The higher of these two fake addresses are assigned to the non-802.1d IS. In this case, when an IS receives a Query Packet on one of its ports, it examines the WAN source address of the Query. If the WAN source address of the received Query Packet is greater than the ISs fake WAN source address, the IS continues sending out its own Query Packets at a periodic interval and it marks the port on which the Query was received as a non-Query Port. If the WAN source address of the received Query Packet is less than the ISs fake WAN source address, the IS stops sending out its own Query Packets and marks the port on which the Query Packet was received as a Query Port. If, however, the WAN source address of the received Query Packet is the same as the ISs fake WAN source address, then the IS compares its LAN address to the LAN source address of the received Query Packet and designates the port a Query Port if the LAN source address of the received Query Packet is less than the IS LAN source address.

Once a port has been designated a Query Port, according to one embodiment of the invention, bridge 62 will maintain that designation until bridge 62 fails to see an IGMP Query Packet on that port within a specified timeout. After a timeout elapses, the port reverts back to a non-Query Port designation. According to a further embodiment of the invention, a bridge is able to cope with an idiosyncracy of IGMP concerning the timeout. In IGMP, the frequency at which a router sends out queries is not specified and there is no information in the IGMP Query Packet that indicates the interval. Therefore, it is not always clear what an appropriate time out for a given Query Port should be. According to this embodiment, a bridge will monitor the frequency at which Query Packets are received on a query port and will then set a timeout that is several times longer than the determined frequency. If no Query Packet is received on a query port for a timeout period, a bridge according to this embodiment will designate the port a non-Query port. When all ports on a bridge according to the invention are designated non-Query Ports, the bridge begins to generate and transmit Query packets.

On non-Query Ports, bridge 62 monitors IGMP Report packets and uses information stored therein to build the BFT. According to the invention, bridge 62 does not forward any IGMP Report packets out of non-Query Ports. Bridge 62 only forwards Report packet out of Query Ports. The reason for this is to prevent ESs on other ports from suppressing their IGMP Report packets because those ESs see another Report on the same LAN having the same WMP request. As explained above, in the IGMP protocol, in order to prevent all ES from each sending their own copy of the Report, ESs monitor all IGMP Report packets on their segment and if they see a Report go by that reports an WMP they are interested in, they don't request that WMP. However, bridge 62 does need to receive a separate Report packet from at least one of each of its segments so that it will know to which segments it must bridge WMPs.

One advantage of the present invention is that it may be implemented in a LAN such as 40 while requiring no new software in the ESs and no new protocol between the ESs and the routers or between the ESs and the bridges. In one embodiment, the present invention may be implemented by modifying some or all of the bridges in a LAN and making no other modifications to the LAN or WAN.

The invention has now been explained with reference to specific embodiments. Other embodiments will be apparent to those of skill in the art. In particular, method steps have been grouped and labelled as being part of various sub-methods in order to increase clarity of the disclosure, however, these steps could be differently grouped without changing the essential operation of the invention. It is therefore not intended that this invention be limited, except as indicated by the appended claims.

What is claimed is:

1. A method for reducing transmission of undesired WAN multicast packets within a LAN, wherein said LAN comprises a plurality of end systems capable of transmitting and receiving packets, said packets having a source address and a destination address, and a plurality of LAN intermediate systems (ISs) capable of transparently forwarding packets, said ISs having a plurality of ports for connecting to network segments, comprising:

detecting at an IS of said ISs WAN multicast queries and recording at said IS an identifier for each port on which said WAN multicast queries are received designating those ports as query ports;

receiving at said IS requests from said end systems to receive WAN multicast packets, said requests being directed by said end system to a destination address other than the destination address of said IS;

storing at said IS identifiers for ports on which said requests are received along with multicast addresses specified in said requests;

forwarding said requests out of only those ports on said IS designated as query ports;

examining at said IS every WAN multicast data packet received to determine the packet's multicast destination address;

forwarding said every WAN multicast data packet out of those ports on which either a request for said multicast packet's destination address or a query was received and generating at an IS a WAN multicast query packet when no ports connected to said IS are designated as query ports and forwarding said WAN multicast query packet out of all ports on said IS.

2. The method according to claim 1 further comprising: examining at said IS the source address of WAN multicast queries received on one of said IS's ports;

comparing said received source address to said IS's source address; and based on said comparing either designating said one of said IS's ports a query port or else continuing to generate at said is WAN multicast queries.

3. The method according to claim 2 wherein said one of said IS's ports is designated a query port if said received source address is less than said IS's source address.

4. The method according to claim 2 wherein said comparing compares WAN source addresses.

5. The method according to claim 2 wherein said comparing compares LAN source addresses.

6. The method according to claim 2 wherein said comparing compares a received WAN source address to a fake WAN source address assigned to said IS.

7. The method according to claim 6 wherein said comparing compares LAN source addresses when there is a tie in values of said WAN source addresses.

8. The method according to claim 7 wherein said LAN contains a plurality of ISs, some of said ISs belonging to a first group having different capabilities of other ISs belonging to a second group, and wherein there are two different fake WAN multicast addresses, one assigned to each group of said LAN ISs, such that WAN multicast queries generated by ISs in one group when received at a port in the other group will always result in that port being designated as a query port.

9. The method according to claim 6 wherein said assigned fake address is a LAN group address which is algorithmically translatable with a WAN source address.

10. The method according to claim 1 wherein there is specified a time out interval wherein if a query packet is not received at a port designated a query port during said timeout interval the port is redesignated as a non-query port.

11. The method according to claim 1 wherein said LAN ISs are devices that forward LAN unicast packets without examining the WAN routing information in said packets.

12. The method according to claim 1 wherein said LAN ISs forward packets transparently to said end systems and without modifying the contents or header of said packets.

13. The method according to claim 1 wherein said end systems communicate with a plurality of routers connecting said LAN to a WAN, said routers and said end systems exchanging control information, said control information including said WAN multicast queries and said requests.

14. The method according to claim 13 wherein said end systems communicate with a plurality of routers using protocols in a TCP/IP protocol suite.

15. The method according to claim 1 wherein at least one of said LAN ISs meet specifications set forth in IEEE 802.1d.

16. The method according to claim 1 wherein at a plurality of said end systems and said ISs communicate using an Ethernet protocol.

17. The method according to claim 1 wherein said WAN multicast queries and said WAN multicast data packets are encapsulated into LAN group packets, said LAN group packets having a LAN multicast address which is algorithmically translatable with said WAN multicast address and wherein said IS detects, stores, and examines said LAN multicast addresses.

18. A method for reducing transmission of undesired WAN multicast packets within a LAN, wherein said LAN comprises a plurality of end systems capable of transmitting and receiving packets, said packets having a source address and a destination address, and a plurality of LAN intermediate systems (ISs) capable of transparently forwarding packets, said ISs having a plurality of ports for connecting to network segments, comprising:

detecting at an IS of said ISs WAN multicast queries and recording at said IS an identifier for each port on which said WAN multicast queries are received designating those ports as query ports;

receiving at said IS requests from said end systems to receive WAN multicast packets, said requests being directed by said end system to a destination address other than the destination address of said IS;

storing at said IS identifiers for ports on which said requests are received along with multicast addresses specified in said requests;

forwarding said requests out of only those ports on said IS designated as query ports;

examining at said IS every WAN multicast data packet received to determine the packet's multicast destination address;

forwarding said every WAN multicast data packet out of those ports on which either a request for said multicast packet's destination address or a query was received wherein there is specified a time out interval wherein if a query packet is not received at a port designated a query port during said timeout interval the port is redesignated a non-query port;

determining at a query port the average time interval between reception of query packets; and setting said time out interval to be several times the average time interval.

19. A local area network comprising;

a plurality of end systems, each with a connection to a network segment wherein said end systems are capable of transmitting on said segment a multicast report packet, said multicast report packet comprising a requested multicast address from which an end system wishes to receive data; and a plurality of bridges, each bridge having connections to at least two network segments, at least one bridge capable of detecting multicast report packets transmitted on said network segments and capable of storing an identifier of said requested multicast address along with an identifier of said segment, said at least one bridge forwarding received multicast packets only to those segments on which a multicast report packet requesting those multicast packets was received wherein said bridges are further capable of detecting multicast query packets received on a port and designating that port a query port and wherein said bridges are capable of determining a frequency of received query packets on a query port and setting a timeout interval to be several times said frequency and wherein said bridges will designate a query port a non-query port when a query packet is not received during a timeout interval.

20. A method for reducing transmission of undesired layer 3 WAN multicast packets within a LAN, wherein said LAN comprises a plurality of end systems capable of transmitting and receiving layer 2 LAN packets, said packets having at least a LAN source address and a LAN destination address, and a plurality of layer 2 LAN intermediate systems (ISs) capable of transparently forwarding packets at layer 2, said ISs having a plurality of ports for connecting to network segments, comprising:

detecting at an IS of said ISs, encapsulated layer 3 WAN multicast queries by examining the contents of all layer 2 group packets and recording at said IS an identifier for each port on which said WAN multicast queries are received designating those ports as query ports;

receiving at said IS layer 3 requests from said end systems to receive WAN multicast data packets, said request being directed by an end system to a destination address other than the destination address of said IS and examining the layer 3 contents of said requests;

storing at said IS in a layer 2 filtering table, identifiers for ports on which said requests are received along with the layer 2 group address specified in said requests;

forwarding said requests out of only those ports on said IS designated as query ports;

filtering at said IS every LAN group addressed data packet based on said layer 2 filtering table and thereby forwarding WAN multicast data packets out of only those ports on which either a request for said multicast data packet's destination address or a query was received; and generating at an IS a layer 3 WAN multicast query packet when no ports connected to said IS are designated as query ports and forwarding said WAN multicast query packet out of all ports on said IS.

21. The method according to claim 20 further comprising:

examining at said IS the source address of WAN multicast queries received on a port of said IS's ports;

comparing said received source address to said IS's source address; and based on said comparing either designating said port a query port or else continuing to generate at said IS WAN multicast queries.

22. The method according to claim 21 wherein said port is designated a query port if said received source address is lower than said IS's source address.

23. The method according to claim 21 wherein said comparing compares a received WAN source address to a fake WAN source address assigned to said IS.

24. The method according to claim 23 wherein said comparing compares LAN source addresses when there is a tie in values of said WAN source addresses.

25. The method according to claim 24 wherein said LAN contains a plurality of ISs, some of said ISs belonging to a first group having different capabilities of other ISs belonging to a second group, and wherein there are two different fake WAN source addresses, one assigned to each group of said LAN ISs, such that WAN multicast queries generated by ISs in one group when received at a port in the other group will always result in that port being designated a query port.

26. The method according to claim 20 wherein said LAN ISs are layer 2 devices that forward LAN unicast packets without examining or changing the contents of said packets.

27. The method according to claim 20 wherein said end systems communicate with a plurality of routers connecting said LAN to a WAN using a layer 3 protocol, said routers and said end systems exchanging control information, said control information including said WAN multicast queries and said requests.

28. The method according to claim 27 wherein said end systems communicate with a plurality of routers using protocols in a TCP/IP protocol suite.

29. The method according to claim 20 wherein at least one of said LAN ISs meet specifications forth in IEEE 802.1d.

30. The method according to claim 20 wherein at a plurality of said end systems and said ISs communicate using an Ethernet protocol.

* * * * *